United States Patent [19]

Rosengren

[11] 4,137,587
[45] Feb. 6, 1979

[54] DOCKBOARD APPARATUS

[76] Inventor: Knut T. L. Rosengren, Box 115, 243 00 Hoor, Sweden

[21] Appl. No.: 872,877

[22] Filed: Jan. 27, 1978

Related U.S. Application Data

[63] Continuation of Ser. No. 733,295, Oct. 18, 1976, abandoned.

[30] Foreign Application Priority Data

Oct. 17, 1975 [SE] Sweden .............................. 7511653

[51] Int. Cl.² .............................................. E61D 1/00
[52] U.S. Cl. ....................................................... 14/71.3
[58] Field of Search ........................ 14/71.3, 71.1, 69.5

[56] References Cited

U.S. PATENT DOCUMENTS

| | | | |
|---|---|---|---|
| 3,426,377 | 2/1969 | Bezkwith | 14/71.3 |
| 3,440,673 | 4/1969 | Kezley | 14/71.3 |
| 3,596,303 | 8/1971 | Kezley | 14/71.3 |
| 3,806,976 | 4/1974 | Yoon | 14/71.3 |
| 3,840,930 | 10/1974 | Waddell | 14/71.3 |

Primary Examiner—Nile C. Byers, Jr.

Attorney, Agent, or Firm—Peter G. Mack

[57] ABSTRACT

A dockboard apparatus is disclosed in which a vertically displaceable chassis moves a pivotally mounted ramp between a vertical storing position and a horizontal working position. Skewing and binding of the chassis are prevented by a construction wherein a counterweight for the chassis is coupled to the chassis by first and second spaced hubs, such as chain sprockets, and first and second linkages, such as drive chains, connected between the chassis, hubs, and counterweight. To facilitate movement of the ramp into place, the support of the dockboard apparatus includes an upper support member having an upper rear part disposed substantially at the same level as the loading surface of the loading dock and an upper front part disposed substantially below the level of the upper rear part. This member may be embodied by an L-shaped beam with vertical and horizontal legs. The hubs are mounted on the upper front part, e.g., on the horizontal leg of the L-shaped beam. With this construction, the ramp may assume a pronounced forward, downward inclination from the loading surface of the loading dock during movement between the storing and working positions.

4 Claims, 2 Drawing Figures

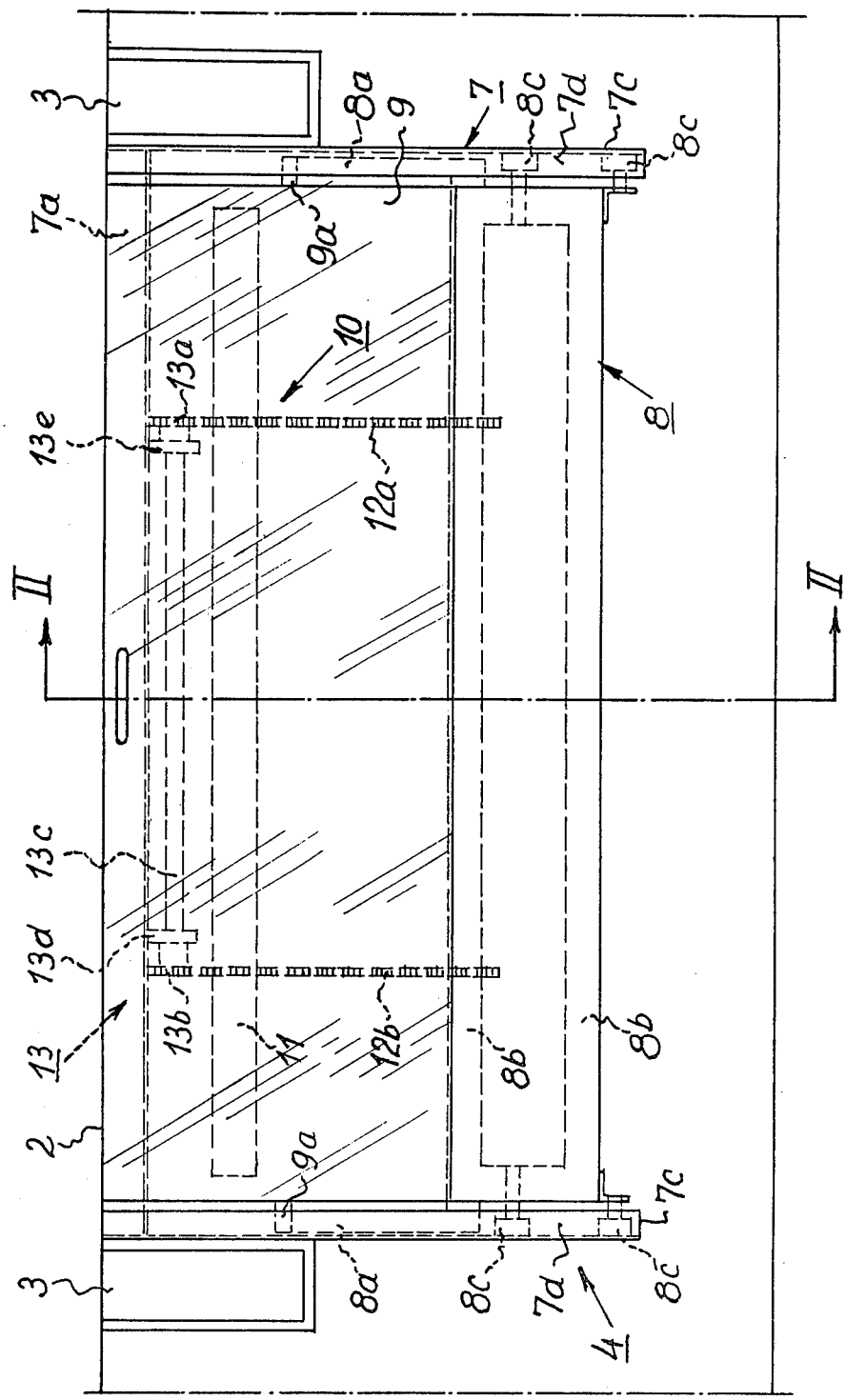

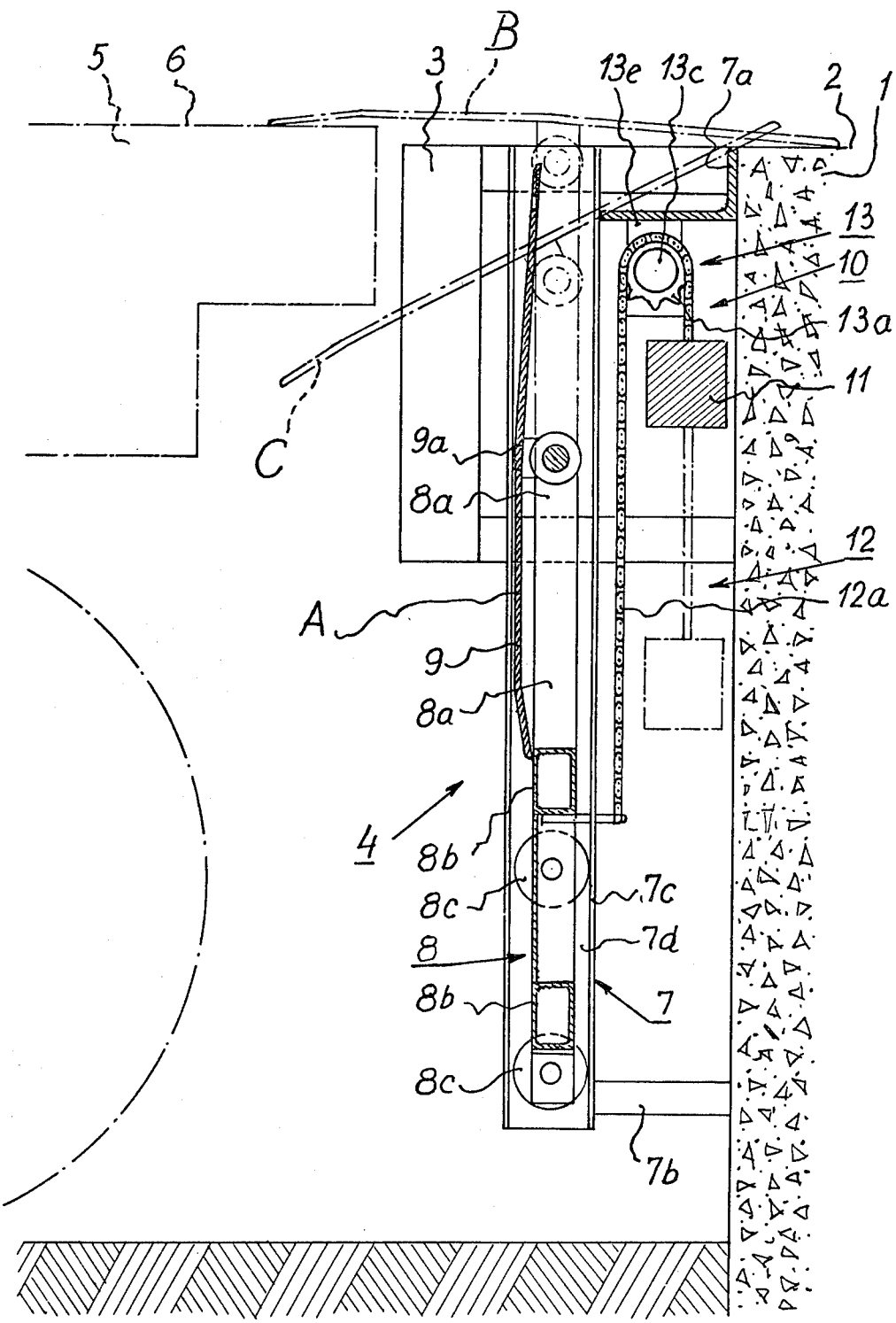

DOCKBOARD APPARATUS

CROSS-REFERENCE TO RELATED APPLICATION

This is a continuation of application Ser. No. 733,295 filed Oct. 18, 1976 and now abandoned.

BACKGROUND OF THE INVENTION

1. Field of the Invention

The present invention relates to a dockboard apparatus having a particular mechanism for emplacement and storage of a ramp.

2. Description of the Prior Art

It is already known to use a dockboard having a movable ramp mounted in fixed supports on the vertical wall of a horizontal loading dock to facilitate the transfer of goods from the horizontal loading dock to an adjacent carrier, such as a truck or railroad car, having a horizontal bed or load surface of the same or nearly the same height as the fixed horizontal surface of the loading dock. U.S. Pat. No. 3,596,303 discloses a dockboard apparatus of the above-mentioned kind having a fixed support on the vertical wall, a chassis carried by the support in movable sliding relationship therewith, and a ramp pivotally mounted on the chassis for movement between a vertical storing position and a horizontal working position wherein it connects the two loading surfaces. The chassis is guided by elongated guide means which mesh with two guide means on the support. A counterbalancing device with a counterweight acts on the chassis.

In dockboard devices of the foregoing type there is a risk that the chassis will become skewed in relation to its guide means at least when the chassis is in its higher positions. In such positions much of the guide means on the chassis are above the guide means on the stationary support and thus are not fully effective in that only small portions of the guide means actually perform the guiding function. Furthermore, such arrangement of movable guide means is not satisfactory with, for example, regard to possible corroding or binding. With such design it is generally difficult to select the right materials and tolerances, and the long guide means are also susceptible to deformation.

SUMMARY

The arrangement according to the present invention eliminates the above-mentioned drawbacks for the type of dockboard devices in question. According to the invention, the chassis is provided with a pair of rollers on each side. In all positions of the chassis, both rollers are in contact with the guide means. Thus, they always ensure movement with insignificant friction and prevent locking of the chassis by skewing. In this same regard, the counterweight is held by two chains or the like which are fastened to the counterweight in mutually spaced relationship and which are entrained on two mutually spaced sprockets or the like which are connected for common rotation.

More specifically, the apparatus of the present invention comprises: a support; a vertically movable chassis on the support; a ramp pivotally supported by the chassis for movement between a substantially vertical storing position and a substantially horizontal working position; a counterbalancing means coupled with the chassis for facilitating manual movement thereof, the counterbalancing means including a counterweight; and first and second linkage means each connecting the counterweight to the chassis. The linkage means may take the form of drive chains. Also included are first and second hubs, which may take the form of sprockets or chainwheels. The first hub is operatively coupled with the first linkage means and the second hub is operatively coupled with the second linkage means. The support includes an upper support member which has an upper rear part disposed substantially at the same level as the loading surface of the loading dock, the upper support member also having an upper front part disposed substantially below the level of the upper rear part. Such construction may be embodied in an L-shaped beam with a first leg disposed substantially vertically on the loading dock to provide the upper rear part and a second leg extending substantially horizontally from the loading dock to provide the upper front part. The first and second hubs are mounted in spaced relationship on the upper front part, i.e. on the second leg which extends horizontally from the loading dock. By this construction, the ramp may assume a pronounced forward, downward inclination from the loading surface of the loading dock during movement between the storing and working positions.

The invention is further described in connection with an embodiment shown in the accompanying drawing.

BRIEF DESCRIPTION OF THE DRAWING

FIG. 1 is a front elevational view illustrating a dockboard apparatus according to the invention; and FIG. 2 is a section taken on the line II—II of FIG. 1.

DETAILED DESCRIPTION

Referring to the drawing, there is illustrated the front part of a loading dock 1 which provides a loading surface 2. On the loading dock there is a bumper 3 which protects the dockboard apparatus 4 from damage by a carrier 5.

The dockboard apparatus 4 has at least three main parts, namely at least one support 7 mounted on the loading dock 1, at least one vertically movable carriage or slider 8 pivoted in the support 7 as well as at least one ramp 9 on the carriage 8, which is pivoted to turn mainly between the vertical storing position A and the horizontal working position B (via position C) connecting load surfaces 3 and 6.

The support consists of at least one upper support member in the form of, for example, an L-shaped beam 7a and lower support members in the form of, for example, rods 7b. On these supports 7a, 7b are mounted two U-shaped members 7c spaced from each other to form the vertical guide 7d for carriage 8.

Carriage 8 has two vertical side beams 8a, which at their lower parts are connected to each other by horizontal connecting beams 8b to form a frame with upwardly projecting beams extending from the frame. At the lower portion of the carriage, each side beam 8a has two rollers 8c which engage the guides 7d. At the upper portion of the carriage each side beam 8a has a bearing 8d. A shaft 9a on the ramp 9 is pivotally mounted in the bearings 8d.

By means of the above carriage construction and owing to the fact that the guides 7c extend upwardly until they are substantially level with surface 2 of the loading dock 1, carriage 8 can be raised to such a height that the ramp 9 can move from the vertical storing position A to the horizontal working position even after the carrier 5 has moved adjacent to loading bridge 4.

After pivoting of the ramp 9 to the extent necessary, the carriage is lowered until the ramp 9 engages the surfaces that are to be connected.

To enable and/or to facilitate moving of carriage 8, which also can be done manually, the carriage is acted upon by at least one balancing means 10, which comprises at least one counterweight 11 connected with the carriage 8 by at least two linkage means 12 which run over an axle 13.

Ordinarily there would be a great risk that the carriage 8 sooner or later will become skewed in the guides, which usually means that it will bind. According to the invention this problem is eliminated in that the axle 13 has two, spaced hubs which may take the form of sprockets or chainwheels 13a, 13b or the like which are joined with each other for mutual rotation (e.g. via a shaft 13c) but mounted in bearings (e.g. in bearing brackets 13d, 13e). The movements of the linkage means, in this case the chains 12a, 12b which run over the sprockets or chainwheels 13a, 13b of the axle 13, are coordinated by virtue of the foregoing construction. As a result, carriage 8 and counterbalance 11 are prevented from changing positions and from becoming skewed in relation to support 7 after having been set.

Owing to the fact that the chainwheels 13a, 13b are rotatably mounted by the shaft 13a in bearing brackets 13d, 13e, which, in turn, are mounted on support 7, a simple and very stable axle arrangement is obtained.

In order to arrange the axle 13 as high as possible but at the same time to make it possible to connect the ramp 9 to a load surface of the carrier which is lower than the loading surface 2 of the loading dock 1, bearings 13d, 13e for the chainwheels 13a, 13b are mounted on the upper support member 7a, which acts as a holder for the guide means. The upper rear part of support member 7a is substantially on the same level as the loading surface 2 of loading dock 1, but the upper front part thereof is lower than that, so that the dockboard 9 can incline forwardly, downwardly from the loading surface 2 of the loading dock 1.

To attain a heavy counterweight which does not take up too much vertical space, the counterweight 11 has an elongated horizontal hollow configuration, preferably tubular square steel with or without filling. By using the whole or nearly the whole distance between the side beams 7c of the support, the counterweight can have a length that corresponds with this distance or falls only slightly short of this.

In order to restrict the movement of carriage 8 and/or counterweight 11, a stop bolt (not shown) can suitably be arranged on the upper support member and/or the loading dock 1.

The above-described embodiment of a dockboard apparatus 4 is set forth to explain the invention and not to restrict it. Other embodiments not described above are possible within the scope of the following claims.

What is claimed is:

1. A dockboard apparatus for a loading dock having a horizontal loading surface and a vertical front wall, the apparatus comprising:
  (a) a support;
  (b) a vertically movable chassis on said support;
  (c) a ramp pivotally supported by said chassis for movement between a substantially vertical storing position and a substantially horizontal working position;
  (d) a counterbalancing means coupled with said chassis for facilitating manual movement thereof, the counterbalancing means including a counterweight;
  (e) first and second linkage means each connecting said counterweight to said chassis;
  (f) first and second hubs, said first hub being operatively coupled with said first linkage means and said second hub being operatively coupled with said second linkage means;
  (g) said support including an upper support member which has an upper rear part disposed substantially at the same level as the loading surface of the loading dock, said upper support member also having an upper front part disposed substantially below the level of said upper rear part, said first and second hubs being mounted in spaced relationship on said upper front part;
  (h) whereby said ramp may assume a pronounced forward, downward inclination from the loading surface of the loading dock during movement between said storing and working positions.

2. A dockboard apparatus as defined in claim 1 wherein said upper support member is an L-shaped beam having a first leg disposed substantially vertically on the loading dock in substantially parallel abutting relationship with the vertical wall thereof to provide said upper rear part of said upper support member, said first leg having top and bottom edges, said L-shaped beam also having a second leg extending substantially horizontally from the bottom edge of the first leg in a direction away from the loading dock to provide said upper front part.

3. A dockboard apparatus as defined in claim 2 including:
  (a) a pair of bearings mounted in spaced relation on said second leg of said L-shaped beam;
  (b) a shaft mounted in said bearings, said hubs being disposed on said shaft for common rotation.

4. A dockboard apparatus as defined in claim 1 wherein said first and second linkage means are drive chains and wherein said first and second hubs are sprockets which entrain said drive chains.

* * * * *